March 12, 1963 L. H. SEGALL ET AL Re. 25,347

ELECTRICAL PULSE DIVIDER

Original Filed Aug. 19, 1958 2 Sheets-Sheet 1

INVENTORS
LOUIS H. SEGALL
JAY C. PELTON, Jr.

BY

ATTORNEYS

ELECTRICAL PULSE DIVIDER

Original Filed Aug. 19, 1958 2 Sheets-Sheet 2

INVENTORS
LOUIS H. SEGALL
JAY C. PELTON, Jr.
BY Bauer and Seymour
ATTORNEYS

United States Patent Office

Re. 25,347
Reissued Mar. 12, 1963

25,347
ELECTRICAL PULSE DIVIDER

Louis H. Segall and Jay C. Pelton, Jr., Sidney, N.Y., assignors to The Bendix Corporation, a corporation of Delaware Original No. 2,916,672, dated Dec. 8, 1959, Ser. No. 756,018, Aug. 19, 1958. Application for reissue Dec. 8, 1961, Ser. No. 158,652
19 Claims. (Cl. 315—277)

Matter enclosed in heavy brackets [ ] appears in the original patent but forms no part of this reissue specification; matter printed in italics indicates the additions made by reissue.

This invention relates to an electrical device for dividing the energy of transient electrical pulses.

It is frequently desired, as in ignition systems, to have two or more spark discharge devices powered by a single source of high frequency transient pulses to discharge two spark discharge devices. The ideal pulse divider for accomplishing this would produce circuit energy at all outputs simultaneously, if all the circuits are operating normally. Further, in such device if one or more branches should have short circuited outputs, the remaining operative branches would continue to function in a normal manner, and, if one or more branches should have open-circuited outputs, the remaining operative branches would continue to function in a normal manner. Although the description of the device is confined herein to ignition uses therefor, it will be understood that the device may be used in any electrical or electronic circuit wherein the output energy of one circuit can be used to control the operation of a plurality of other circuits.

The invention has among its objects the provision of a novel simple device for dividing the energy of transient electrical pulses.

A further object of the invention lies in the provision of a device for dividing the energy of high frequency electrical pulses to produce circuit energy at multiple outputs when such outputs are operating normally.

Yet another object is the provision of a pulse divider wherein if one or more outputs are short circuited the remaining operative outputs continue to function in a normal manner.

A still further object is the provision of a pulse divider wherein if one or more outputs are in open circuited condition the remaining operative outputs continue to function in a normal manner.

Still another object is the provision of a pulse divider wherein the performance at the remaining operative output or outputs is equal to or better than the performance of the same circuit with but one output, when such multiple output circuit has one or more of its outputs short circuited or open circuited.

The above and further objects and novel features of the invention will more fully appear from the following description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views.

Figure 1:
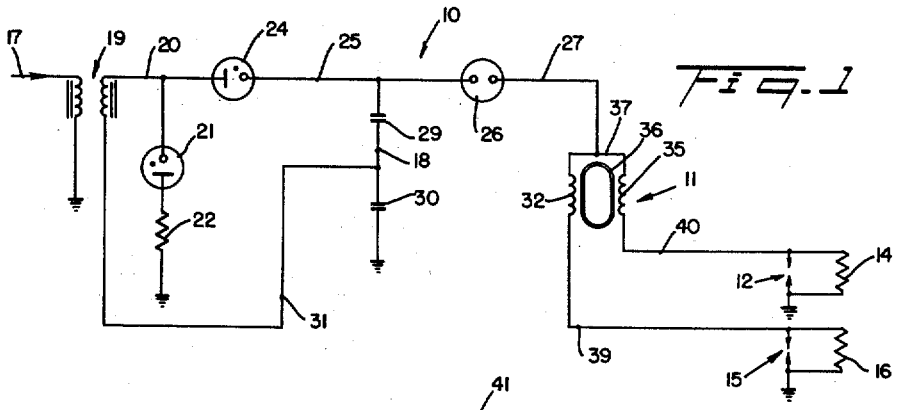
FIG. 1 is a circuit diagram of an ignition supply system provided with a first embodiment of pulse divider made in accordance with the invention, such divider being of the closed magnetic circuit type, and providing two outlets.
Figure 2:
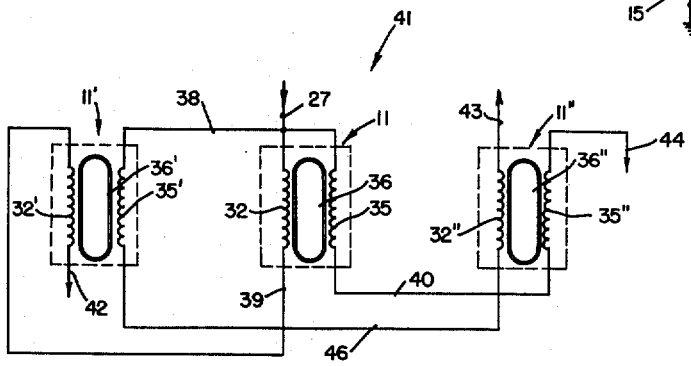
FIG. 2 is a circuit diagram of a second embodiment of closed magnetic circuit type pulse divider, such divider providing three outlets.
Figure 3:
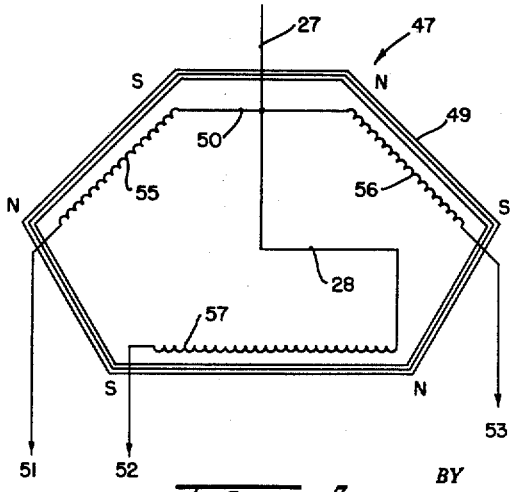
FIG. 3 is a circuit diagram of a third embodiment of closed magnetic type pulse divider, such divider providing three outlets.
Figure 4:
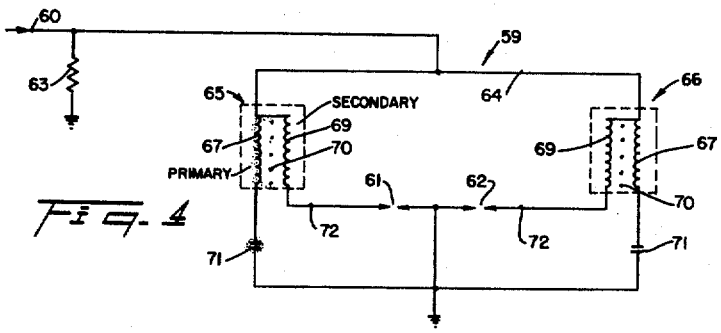
FIG. 4 is a circuit diagram of a fourth embodiment of pulse divider made in accordance with the invention, such divider being of the so-called high frequency, high voltage type.
Figure 5:
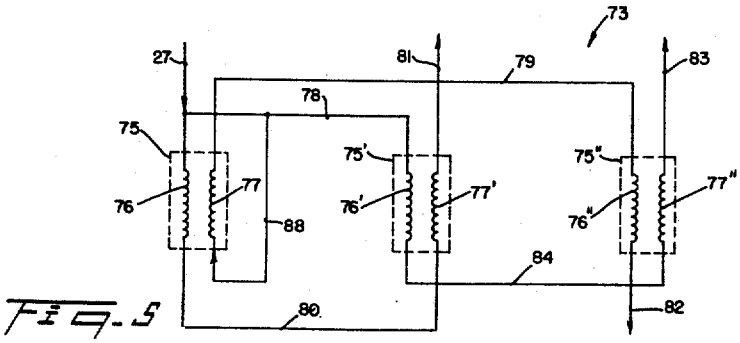
FIG. 5 is a circuit diagram of a fifth embodiment of pulse divider made in accordance with the invention, such divider being of the inductively-linked or air-core type, the embodiment shown providing three outlets.
Figure 6:
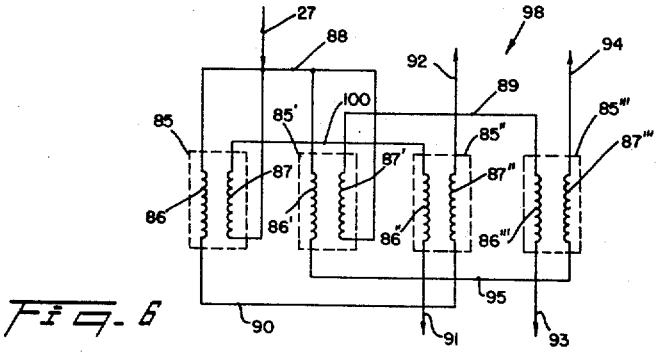
FIG. 6 is a circuit diagram of a sixth embodiment of pulse divider, the divider being generally similar to that of FIG. 5 but providing four outlets.

It will be apparent from the above that there are shown herein six embodiments of pulse dividers made in accordance with the invention, the embodiments of FIGS. 1, 2 and 3 being of the closed magnetic circuit type, that of FIG. 4 being of the high frequency type, and those of FIGS. 5 and 6 being of the inductively-linked or air-core type.

Turning now to FIG. 1, there is shown therein a supply circuit for an ignition circuit of the condenser-control gap type. A supply lead wire 17, from an alternating current source (not shown), feeds the primary of a step-up transformer 19, which is preferably of the loosely coupled type. One lead wire 20 from the secondary of transformer 19 is branched as shown, one branch having a half-wave rectifier 21 therein and the other branch having a reversely connected half-wave rectifier 24 therein. The plate of rectifier 21 is connected to ground-through resistance 22. The cathode of rectifier 24 is connected through a wire 25 to a control gap 26, the control gap being connected to a pulse divider 11 by wire 27.

The pulse divider 11, whose construction and manner of operation will be explained, has two outlets 39 and 40. Such outlets in the illustrative embodiment are connected, respectively, to spark discharge devices 15 and 12, which are of the gap-shunted type shown, for example, in Tognola Patent No. 2,684,665. In such devices 12 and 15, the opposed electrodes are bridged by semiconductive material shown as resistors 14 and 16, respectively.

The other lead wire 31 from the secondary of transformer 19 is connected to a wire 18 which extends between ground and wire 25 at a location between rectifier 24 and control gap 26. Interposed between the connection between wires 18 and 31 and wire 25 is a first condenser 29. Interposed between such connection and ground is a second similar condenser 30.

The circuit which has been thus far described functions as follows: The condensers 29 and 30, which are connected in series, are alternately charged by opposite sides of the waves of the alternating current impressed on the circuit through wire 17. When such condensers have received a charge of sufficient potential, they cause control gap 26 to discharge. Such discharge, carried by wire 27, is fed to pulse divider 11. Two equal and simultaneous pulses flow from divider 11 to spark discharge devices 12 and 15 through wires 40 and 39.

Pulse divider 11 in the form shown has a flattened ring type closed magnetic core 36, which may be made, for example, of laminated silicon iron or of ferramic type core materials. The divider has two identical low impedance coils 32 and 35 closely associated with such core, as by being wound around opposite legs thereof. The coils 32 and 35 are disposed on the core and are so connected that a pulse through one coil from the input to the outlet end thereof induces a pulse in the other coil from the input to the outlet end thereof. When the coils are disposed generally as shown, they are wound in opposite directions and the inlet (upper as shown) ends of the coils are connected by a wire 37 to which wire 27 from the energy source is connected.

There are two requirements which the pulse divider 11 must meet in order to have the operational characteristics above described when the transient discharges in all branches are simultaneous: (1) when equal energy outputs are required at the various outlets, all divider branches must have equal impedances, and (2) that the branch impedances must be of sufficient size so that when open or short circuited conditions develop in one or more branches, the remaining branches will not be affected by the malfunctioning outputs. For preferred performance, it is necessary that the branch inductances be matched to the discharge circuit to provide a maximum energy output.

The pulse divider 11 functions as follows: When an energy pulse is applied to input wire 37 of the divider, one of the spark discharge devices 12, 15 will inherently discharge before the other, no matter how closely identical such devices are made. Let us assume that device 12 discharges first. The resulting current flow in coil 35 causes a sudden flux build-up in magnetic core 36. Such flux build-up induces a voltage in coil 32, such induced voltage being additive to that impressed on the coil 32 by wire 27. Thereupon spark discharge device 15 fires, the resulting current flow in coil 32 adds to or tends to maintain the flux in core 36. Preferably core 36 is of such character that it is saturated upon the discharge of one of the branch circuits of the pulse divider.

Energy tests show that the spark energies of the devices 12 and 15 are equal when both circuits 32, 39 and 35, 40 of the divider are electrically equivalent. The energy in the operating spark discharge device when the other device is short circuited is essentially the same as when both devices are operating. This result is obtained because the inductance of each coil at the discharge frequency offers the essential impedance of each branch. Hence each branch is still an electrical identity. Also, with these system conditions, when current begins to flow in the shorted or other branch a voltage is induced in the non-shorted coil. This induced voltage is additive to that of tank condenser 29, 30, thereby raising the voltage applied to the non-shorted or non-firing spark discharge device. In many instances this breaks down the gap of the temporarily non-firing device, and allows a spark discharge to follow. When, on the other hand, the output lead from one divider coil is open while the other branch operates, the full stored energy is dissipated through the operative igniter.

The pulse divider 41 shown in FIG. 2 may be connected to the supply circuit in place of divider 11 shown in FIG. 1. Divider 41 is made up of three coil pair units identical with pulse divider 11 of FIG. 1. The center coil pair unit of FIG. 2 is thus designated 11, the other two coil pair units being designated 11′ and 11″, respectively. Corresponding parts of units 11, 11′, and 11″ are designated by the same reference characters as in FIG. 1 but with added primes and double primes in the units 11′ and 11″, respectively.

In the pulse divider of FIG. 2 the same (upper as shown) ends of coils 35′, 32, and 35 are connected by a wire 38, to which input wire 27 is connected. The other (lower) end of coil 35′ is connected by a wire 46 to the lower end of coil 32″. The upper end of coil 32′ is connected by wire 39 to the lower end of coil 32. The lower end of coil 35 is connected by wire 40 to the lower end of coil 35″. The lead 42 from the lower end of coil 32′ and the leads 43 and 44, from the upper ends of coils 32″ and 35″, respectively, are output leads to which identical spark discharge devices, such as devices 12 and 15 of FIG. 1, may be attached.

The three coil pair units 11, 11′, and 11″ are preferably located close to each other, as in side-by-side relationship, so as to keep the various lead wires short. Preferably the input lead 27 enters the coil assembly from one side, and the output leads leave the other side of the assembly in spaced parallel relation.

The coil pairs of the pulse divider 41 function in much the same manner as that designated 11 in FIG. 1 but with the differences that two additively connected coils are interposed in the circuit of each branch, and that each of such two coils is located in a different coil pair unit. Thus, for example, coils 32 and 32′ are connected in series in the circuit of output 42. An energy pulse entering divider 41 through wire 27 is divided to pass through three coils, 32, 35, and 35′. The output circuit initially activated depends upon which of the three spark discharge devices (not shown) fires first. The current rush through such activated circuit builds up the flux in the cores of the units having a coil in the activated circuit. This in turn induces a voltage in the direction from input to output in those coils in previously non-activated or non-discharging circuits which are associated with such cores. It will be seen that unit 11 functions in the same manner in the circuit of FIG. 2 as it does in FIG. 1 with the exception that its outputs activate and govern the circuits of units 11′ and 11″. The units 11′ and 11″, thus activated, supply output leads 42, 43, and 44 with simultaneous pulses. Such leads may be connected, for example, to three spark discharge devices such as devices 12 and 15 in FIG. 1.

In FIG. 3 there is shown a pulse divider 47 employing a continuous toroidal core 49. Divider 47 may be substituted for divider 11 in FIG. 1 to supply pulses to three spark discharge devices. Three similar coils 55, 56, and 57 are closely associated with the core 49 so as to be effectively magnetically linked thereby. The input ends of the coils are connected to input wire 27 through wires 28 and 50, the output ends of the coils being connected to output lead wires 51, 52, and 53. Coils 55, 56, and 57 are related to the magnetic core 49 in such manner that a unidirectional flux through the core is induced therein by current passing through each of the coils from wire 27. To illustrate such relationship the characters N and S have been applied to the core at the ends of each coil.

It is desirable that in the divider of FIG. 3 the assembly should be compact, the various leads short, and the coils be symmetrically disposed on the core. In one suitable arrangement, wherein the magnetic linking of the coils is particularly efficient, the coils are wound around the core, the coils are disposed at substantially equal angles around the axis of the core, the input lead wire enters at one side of the divider and the three output lead wires leave the other side of the divider in substantially equally spaced relationship.

In FIG. 4 there is shown a pulse divider which is particularly adapted for use with a high frequency pulse supply and with high tension igniter plugs. Such divider is generally designated by the reference character 59. The divider is supplied through an input wire 60 which is connected through branch input wire 64 to the input ends of coil pair units 65 and 66. A resistance 63 is interposed between wire 60 and ground. Units 65 and 66 are identical, each having a primary 67 and a secondary 69 which are magnetically linked by a powdered iron core 70. The output (lower as shown) end of primary 67 of each unit is connected to ground through an interposed condenser 71. The output ends of secondary coils 69 are connected through wires 72 to one electrode of each of spark plugs 61 and 62. The other electrode of each of such spark plugs is grounded as shown.

In place of the primary winding 67 and condenser 71 associated with each coil pair, there may be substituted a condenser, for example, of the foil type, which is wound inductively and serves as the primary for the high frequency transformers or coil pairs 65 and 66.

The pulse divider 59 functions as follows: When an energy pulse is applied to input wire 60, the inductively wound primaries of units 65 and 66 and the series connecting condenser 71 receive the initial energy pulse. The inductive component of winding 67 induces a voltage on the secondary winding 69, while the condenser 71 limits the current flow of the primary and determines the discharge frequency of the circuit. A typical frequency of the coils shown in FIG. 4 is about 10 megacycles. At this frequency, the initial voltage peak is obtained at about .03 microsecond. Within this period all circuits become active and start to discharge. Since the initial pulse occurs within such a short time period, the discharges can be said to take place simultaneously.

Coil pairs 65 and 66 act as high frequency voltage step-up transformers, the primary 67 being a high frequency, low turn, wound inductance. The secondary 69 has a number of turns which may be from about 3 to about 10 times greater than the number of turns in the primary, depending upon the output voltage desired. The pulses in the primary are of such high frequency that the rate of use of the pulses in the secondary circuits is so rapid as to produce ionization in the gaps of the spark discharge devices before there is a current flow across either gap. When the impedances in the output circuits are the same, a current flow occurs simultaneously across the two gaps. There is thus an even division or splitting of the energy between the discharges of the two gaps.

In FIGS. 5 and 6 there are shown two embodiments of inductively linked or air-core pulse dividers. The pulse divider 73 of FIG. 5 has three coil pairs 75, 75′, and 75″, each having identical but oppositely wound primary and secondary coils, such coils being designated 76 and 77, respectively, in unit 75, and by the same reference characters with an added prime and an added double prime, respectively, in units 75′ and 75″. The primary and secondary of each coil pair are closely associated so as to be effectively magnetically linked without the use of a magnetic core.

A source of high energy transient pulses, such as wire 27 in FIG. 1, is connected to the input end of coil 76 and through branch wire 78 to the input end of coil 76′. The upper end of coil 77 is connected to the upper end of coil 76″ through wire 79. The lower end of coil 77 is connected to input wire 27 through wires 88 and 78. The lower end of coil 76 is connected to the lower end of coil 77′ through wire 80. The lower end of coil 76′ is connected to the lower end of coil 77″ through wire 84. Output leads 81, 82, and 83 are connected respectively to the upper end of coil 77′, the lower end of coil 76″, and the upper end of coil 77″.

Pulse divider 73 functions in essentially the same manner as divider 41 of FIG. 2. Each branch circuit has two coils connected in series so that their voltages are additive, one such coil being a part of one coil pair unit and the other coil being a part of another coil pair unit.

The pulse divider 98 shown in FIG. 6 provides for simultaneous output pulses for one input pulse. The divider includes four coil pair units 85, 85′, 85″, and 85‴. Each coil pair unit has identical oppositely wound coils, such coils being designated 86 and 87 in unit 85 and by the same reference characters with the appropriate superscript in the other coil pair units.

The input wire 27 is connected either directly or through branch wire 88 with the upper end of coil 86, the lower end of coil 87, the upper end of coil 86′, and the lower end of coil 87′. The lower end of coil 86 is connected to the lower end of coil 87″ through wire 90. The lower end of coil 86′ is connected to the lower end of coil 87‴ through wire 96. The upper end of coil 87 is connected to the upper end of coil 86″ through wire 100. The upper end of coil 87′ is connected to the upper end of coil 86‴ through wire 89. The output lead wires 91, 92, 93, and 94 are connected respectively to the lower end of coil 86″, the upper end of coil 87″, the lower end of coil 86‴, and the upper end of coil 87‴. The manner of operation of pulse divider 98 will be obvious from the previous description of dividers 41 and 73 of FIGS. 2 and 5, respectively.

Although only a limited number of embodiments of the invention have been illustrated in the accompanying drawings and described in the foregoing specification, it is to be expressly understood that various changes, such as in the relative dimensions of the parts, materials used, and the like, as well as the suggested manner of use of the apparatus of the invention, may be made therein without departing from the spirit and scope of the invention as will now be apparent to those skilled in the art. Thus in accordance with the teachings of the invention, pulse dividers may be provided to supply any feasible number of output branches with pulses from a single pulse source.

What is claimed is:

1. An electrical device for dividing the energy of high frequency transient pulses impressed thereon into a plurality of simultaneous output pulses, consisting essentially of a plurality of similar interconnected units, each unit having two inductance coils magnetically linked together, input lead wires connected to the first ends of the coils, and output lead wires connected to the second ends of the coils, the coils in each unit being so oriented relative to their magnetic linkage and the ends of the coils being so connected that the flux induced by an energy discharge through a first coil of the unit from the input to the output end thereof induces a voltage in each of the other coils of the unit in the direction from the input to the output end of other coils of the unit, the units being so connected that each discharge circuit includes two similar coils, each one such coils being in a different unit, connected in series between the input and the output of such circuit.

2. An electrical device as claimed in claim 1, wherein the output of each discharge circuit is connected to a respective spark discharge means.

3. An electrical device as claimed in claim 1, wherein each unit comprises a magnetic core linking the said coils of said unit.

4. An electrical device as claimed in claim 1, wherein the coils of each unit are disposed close to each other and are linked by an air core.

5. An electrical device for dividing the energy of high frequency transient pulses impressed thereon into a plurality of simultaneous output pulses, comprising a plurality of interconnected step-up transformer units, each unit having a primary circuit and a secondary circuit, the primary circuit having substantial inductance and capacitance therein, the secondary circuit having an inductance coil, the primary circuit and the inductance coil of the secondary circuit being magnetically interlinked, the corresponding first ends of the primary circuit and the secondary coil being connected to a common input lead, the second ends of each of the secondary coils being connected to a respective output lead.

6. An electrical device as claimed in claim 5, wherein each of the output leads is connected to a respective spark discharge means.

7. An electrical device for dividing the energy of high frequency transient pulses impressed thereon into a plurality of simultaneous output pulses, comprising a plurality of similar interconnected step-up transformer units, each unit having a primary inductance coil and a secondary inductance coil, the primary and secondary coils being magnetically interlinked, the corresponding first ends of the primary and secondary coils being connected to a common input lead, the other ends of the primary leads, beyond the primary coils, each having a similar condenser therein, the second ends of each of the secondary coils being connected to a respective output lead.

8. An electrical device as claimed in claim 7, wherein each of the output leads is connected to a respective spark discharge means.

*9. An electrical device for dividing the energy of high frequency transient pulses impressed thereon into a plurality of simultaneous output pulses, comprising a plurality of interconnected transformer units, each unit having a primary circuit and a secondary circuit, the primary circuit having substantial inductance and capacitance therein, the secondary circuit having an inductance coil, the primary circuit and the inductance coil of the secondary circuit being magnetically interlinked, the corresponding first ends of the primary circuit and the secondary coil being connected to a common input lead, the second ends of each of the secondary coils being connected to a respective output lead, at least one of the transformer units having a primary winding which is a capacitor.*

*10. An electrical device for dividing the energy of high frequency transient pulses impressed thereon into a plurality of simultaneous output pulses, comprising a plurality of interconnected transformer units, each unit having a primary circuit and a secondary circuit, the primary circuit having substantial inductance and capacitance therein, the secondary circuit having an inductance coil, the primary circuit and the inductance coil of the secondary circuit being magnetically interlinked, the corresponding first ends of the primary circuit and the secondary coil being connected to a common input lead, the second ends of each of the secondary coils being connected to a respective output lead, each of the transformer units having a primary winding which is a capacitor.*

*11. An electrical device for dividing the energy of high frequency transient pulses impressed thereon into a plurality of simultaneous output pulses, comprising a plurality of similar interconnected step-up transformer units, each unit having a primary inductance coil and a secondary inductance coil, the primary and secondary coils being magnetically interlinked, the corresponding first ends of the primary and secondary coils being connected to a common input lead, the other ends of the primary leads, beyond the primary coils, each having a similar condenser therein, the second ends of each of the secondary coils being connected to a respective output lead, at least one of the transformer units having the primary inductance coil in the form of a sheet wound capacitor.*

*12. An electrical device for dividing the energy of high frequency transient pulses impressed thereon into a plurality of simultaneous output pulses, comprising a plurality of similar interconnected step-up transformer units, each unit having a primary inductance coil and a secondary inductance coil, the primary and secondary coils being magnetically interlinked, the corresponding first ends of the primary and secondary coils being connected to a common input lead, the other ends of the primary leads, beyond the primary coils, each having a similar condenser therein, the second ends of each of the secondary coils being connected to a respective output lead, each of the transformer units having the primary inductance coil in the form of a sheet wound capacitor.*

*13. In electrical apparatus, a spark gap, a condenser connected to discharge across said gap, means for charging said condenser to a voltage below the spark over voltage of said gap, and triggering means for intermittently rendering said gap conductive to the charge on said condenser, said triggering means including a transformer, the primary winding of which is a capacitor and the secondary winding of which is connected to said gap.*

*14. Electrical apparatus as defined in claim 13, comprising means for controlling the discharge of said condenser and wherein said windings are connected in parallel to said condenser.*

*15. In electrical apparatus, a transformer comprsing a secondary winding inductively coupled to a primary winding in the form of a sheet wound capacitor, and a condenser connected to be at least partially discharged into said capacitor to induce a voltage across said secondary winding.*

*16. In electrical apparatus a storage condenser adapted to be charged by a source of electrical energy, a transformer comprising a secondary winding and a primary winding consisting of a sheet-wound capacitor, said windings being connected in parallel circuits to said condenser, and means for controlling the discharge of said condenser into said transformer.*

*17. Electrical apparatus as defined in claim 16, comprising an igniter gap connected to said secondary winding and having a normal spark over voltage in excess of the voltage to which the condenser is charged.*

*18. Electrical apparatus as defined in claim 16, wherein said means for controlling the discharge of the condenser is a spark gap.*

*19. In electrical apparatus, a source of current pulses, a storage condenser connected to such source to be charged by said pulses, a control gap connected to the storage condenser, the control gap being adapted to discharge the storage condenser therethrough when the charge on the storage condenser reaches a voltage equalling the breakdown voltage of the control gap, a voltage step-up transformer connected to the control gap to be energized by the discharge through the control gap, and an igniter gap connected to the output of the transformer, the voltage step-up transformer comprising a second condenser functioning also as a primary winding of the transformer, and a secondary winding magnetically linked to the primary winding.*

References Cited in the file of this patent or the original patent

UNITED STATES PATENTS

| | | |
|---|---|---|
| 2,140,736 | Demontrignier | Dec. 20, 1938 |
| 2,441,277 | Lamphere | May 11, 1948 |
| 2,497,166 | Goldberg et al. | Feb. 14, 1950 |
| 2,521,513 | Gray | Sept. 5, 1950 |
| 2,589,164 | Tognola | Mar. 11, 1952 |
| 2,651,005 | Tognola | Sept. 1, 1953 |
| 2,716,720 | McNulty | Aug. 30, 1955 |
| 2,790,935 | Lautenberger et al. | Apr. 30, 1957 |
| 2,837,698 | Segall | June 3, 1958 |
| 2,927,248 | Ramsey | Mar. 1, 1960 |

FOREIGN PATENTS

| | | |
|---|---|---|
| 54,406 | Austria | July 25, 1912 |
| 841,434 | Great Britain | July 13, 1960 |